Aug. 9, 1955     R. R. NYDEGGER ET AL     2,715,024
STRIP FEEDING DEVICE
Filed March 7, 1951     3 Sheets-Sheet 1
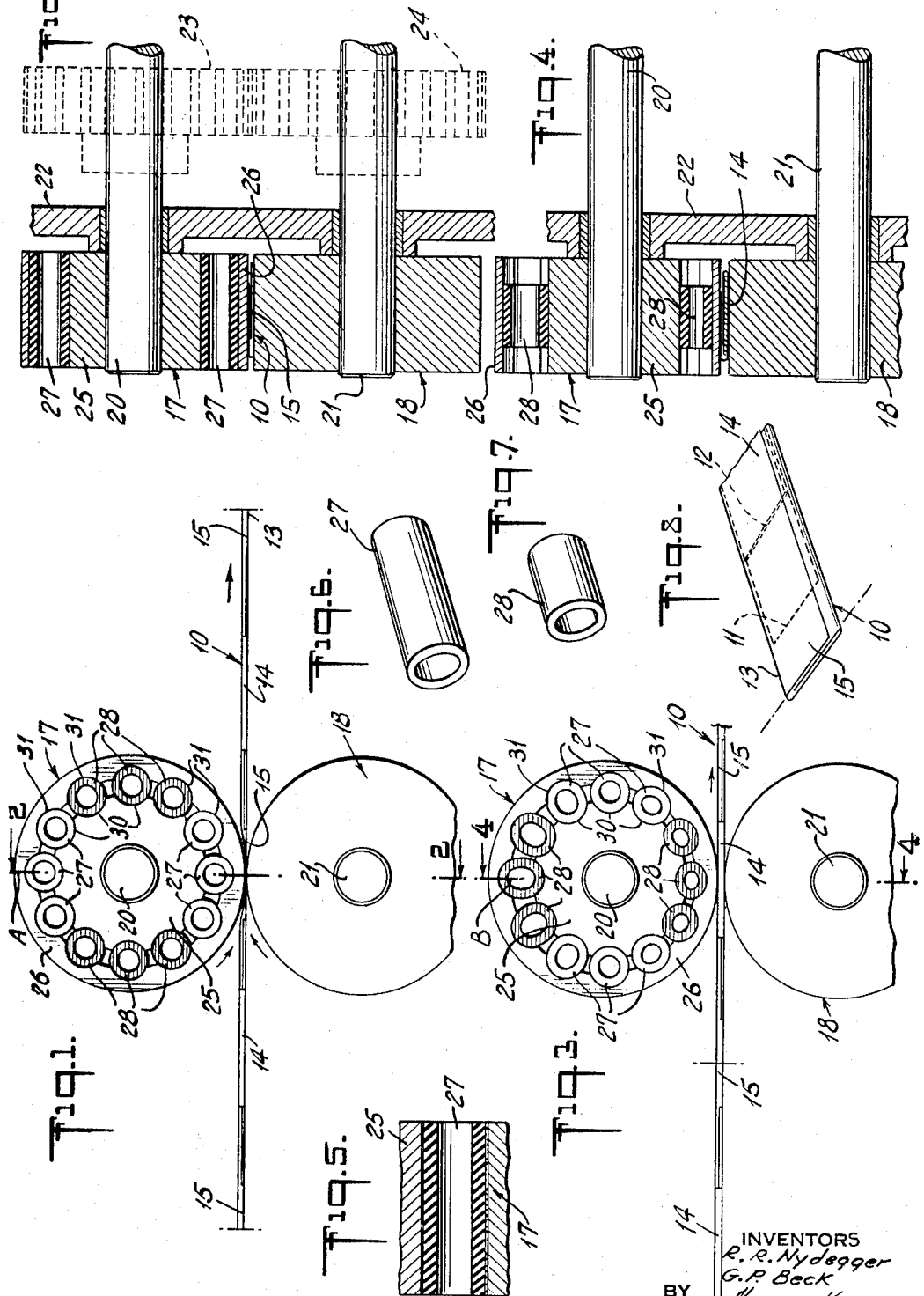
INVENTORS
R. R. Nydegger
G. P. Beck
BY Morrison, Kennedy
& Campbell
ATTORNEYS Aug. 9, 1955  R. R. NYDEGGER ET AL  2,715,024
STRIP FEEDING DEVICE
Filed March 7, 1951  3 Sheets-Sheet 2

INVENTORS:
ROLAND R. NYDEGGER.
and GASPER PAUL BECK.
BY
Morrison, Kennedy & Campbell
ATTORNEYS

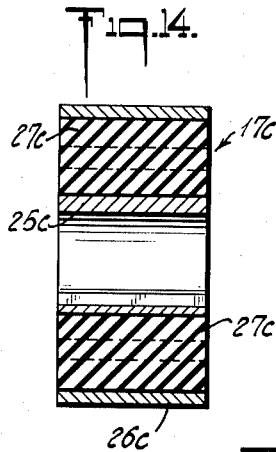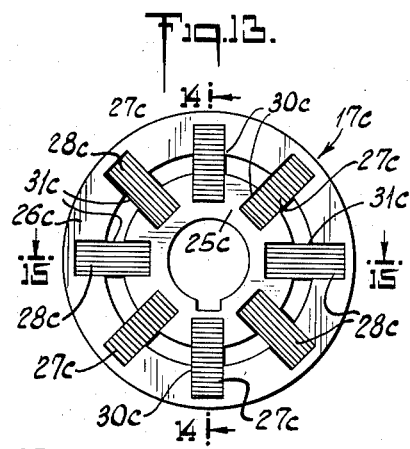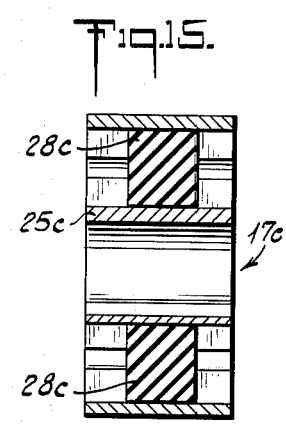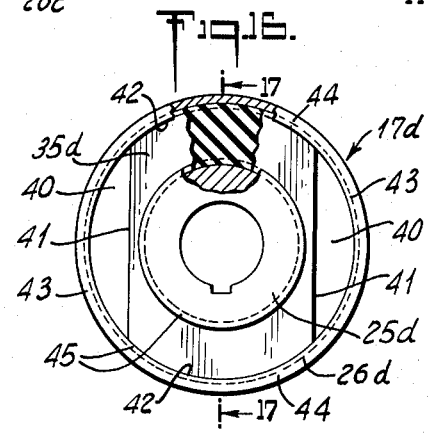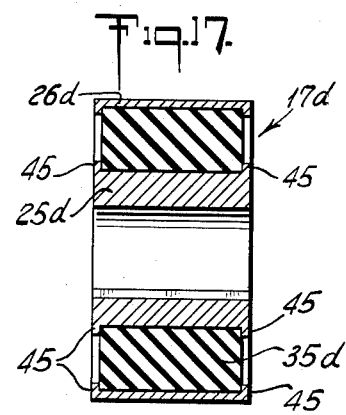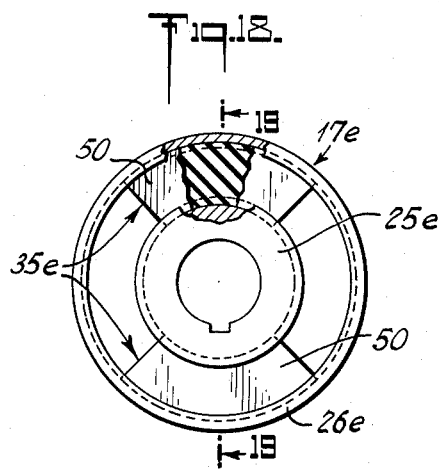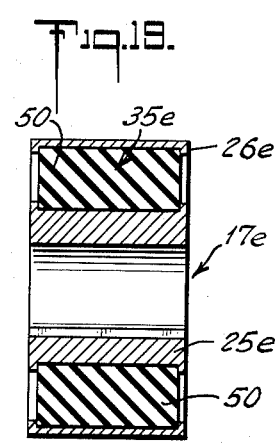

United States Patent Office 2,715,024
Patented Aug. 9, 1955

2,715,024

STRIP FEEDING DEVICE

Roland R. Nydegger, Metuchen, and Gasper Paul Beck, Highland Park, N. J., assignors to Johnson & Johnson, a corporation of New Jersey Application March 7, 1951, Serial No. 214,418

33 Claims. (Cl. 271—2.3)

The present application is a continuation in part of copending application Serial No. 162,336/1948, filed May 16, 1950. The invention described in the present application relates to strip feeding means and particularly to rotary devices for feeding flat web-like strips of varying thicknesses.

In certain mechanical operations, it is required to feed longitudinally a continuous flat strip having sections of uniform thicknesses recurring therealong at uniform intervals and separated by regularly occurring sections of less uniform thicknesses. For example, in the manufacture and packaging of adhesive bandages, adhesive plaster units carrying respective gauze pads are spaced along a flat continuous tubular wrapper to form a continuous strip. This strip has a series of thick and thin sections alternately arranged in accordance with a regular repeat pattern. For feeding such a strip, as for example to a cutting station to sever the strip transversely between the bandage units, a feed device is employed comprising a pair of opposed rotary feed rolls having peripheral nip or tractive engagement with the strip therebetween. If the centers of the feed roll peripheries are fixed, then these rolls will bear with greater tractive pressure against the thicker sections of the strip than they will against the thinner sections. As a result, the roll force on the strip will be nonuniform and the speed of advancement of the strip will consequently vary. Moreover, if the feed rolls are radially set to accommodate properly the thinner sections of the strip, the pressure exerted on the thicker sections might be excessive enough to crush them excessively and/or to jam the feed rolls. If the feed rolls are radially set to accommodate properly the thicker sections of the strip, the rolls will engage the thinner sections of the strip with insufficient feeding pressure.

One object of the present invention is to provide a new and improved roll device which feeds a continuous strip of regularly varying thickness with substantially uniform tractional pressures, which lends itself readily to changes by which the pattern of applied strip feeding pressure may be varied and which is comparatively simple and inexpensive to manufacture.

As a feature of the present invention, the roll device comprises a pair of opposed feed rolls adapted to engage therebetween the strip to be advanced. One of these feed rolls has a rim member of rigid material such as metal, resiliently mounted on or coupled to a hub member or supporting shaft by elastic means arranged around the center of said rim member and permitting said rim member to yield radially with respect to the shaft or to the hub member, as said rim member is rotated in feed engagement with the strip. The elastic means varies therealong in strength (i. e. the force required to produce a predetermined deformation therein) in accordance with the pattern of thick and thin sections occurring in the strip to be fed and suffers deformation as the roll engages the strip and the rim member is radially displaced or deflected thereby.

In one embodiment of the invention, the elastic means is in the form of separate elastic elements arranged around the hub member or supporting shaft and varying in strength. The extent of elastic deformation of each of these elements at any instant depends on the thickness of the section of the strip in traction engagement with the roll at said instant and the force transmitted by each of the deformed elements to said strip depends on the strength of said element. The elastic elements of different strength are arranged with respect to the location of the thick and thin strip sections to transmit resultantly to the strip substantially uniform traction pressure, regardless of the thickness of the section of the strip under roll pressure.

In another embodiment of the present invention, the elastic means takes the form of an annulus of elastic material such as rubber, attached at its inner periphery to the outer periphery of an inner member or hub, and attached at its outer periphery to the inner periphery of a rim of rigid material. The necessary variable resistance to the radial movement of the rim is obtained by perforating the elastic annulus and varying the size of the holes, varying the distance between the holes or making the holes uniform but removing a portion of the elastic annulus between the holes where more resiliency is desired.

In still another embodiment of the invention, the elastic means takes the form of a core of resilient material, such as rubber, embracing and attached to the outer periphery of an inner member or hub and extending to the inner periphery of a rigid rim member only in certain radial directions, to offer maximum of elastic resistance to the radial movement of the rim in said direction. This core of resilient material is spaced along other radial directions from said rim member to offer minimum of resistance to the radial movement of said rim member in said other directions. The core of resilient material may be in one or more pieces.

Various other objects, features and advantages of the invention are apparent from the following particular description and from an inspection of the accompanying drawings, in which:

Fig. 1 is a face view of a form of strip feeding roll device embodying the present invention and shown with the resiliently rimmed feed roll in rotative position to contact the thinner section of the strip being advanced;

Fig. 2 is a section of the strip feeding roll device taken along lines 2—2 of Fig. 1;

Fig. 3 is a face view of the strip feeding roll device shown with the resiliently rimmed feed roll in rotative position to contact the thicker section of the strip being advanced;

Fig. 4 is a section of the roll device taken along lines 4—4 of Fig. 3;

Fig. 5 is a detail section of one of the stronger elastic elements employed to resiliently support the rim member of one of the rolls of the strip feeding device and shown in keying position between the hub member and the rim member of the roll;

Fig. 6 is a perspective of one of the stronger elastic elements;

Fig. 7 is a perspective of one of the weaker elastic elements;

Fig. 8 is a fragmentary perspective of the strip adapted to be advanced by the feeding device of the present invention;

Fig. 13 is a face view of another form of resiliently rimmed feed roll embodying the present invention;

Fig. 14 is a radial section of the feed roll taken on lines 14—14 of Fig. 13;

Fig. 15 is a radial section of the feed roll taken on lines 15—15 of Fig. 13;

Fig. 16 is a face view of another form of resiliently rimmed feed roll embodying the present invention;

Fig. 17 is a radial section of the feed roll taken on lines 17—17 of Fig. 16;

Fig. 18 is a face view of another form of resiliently rimmed feed roll embodying the present invention; and Fig. 19 is a radial section of the feed roll taken on lines 19—19 of Fig. 18.

Figure 9:
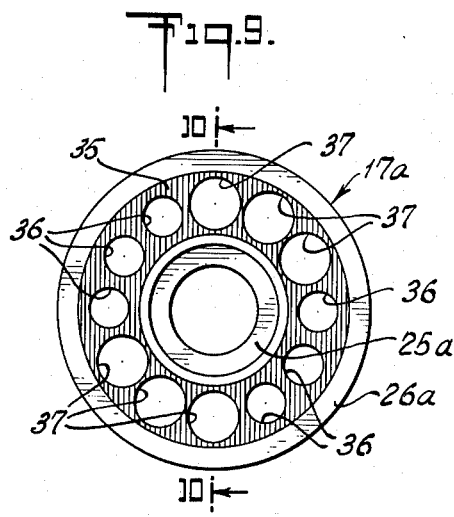
Fig. 9 is a face view of another form of resiliently rimmed feed roll embodying the present invention.

Referring to the drawings and especially to Fig. 8, there is shown a flat web-like continuous strip 10 adapted to be advanced longitudinally by the feeding device of the present invention. This strip 10 may be of any suitable form and construction, but is shown for purposes of illustration as comprising a series of spaced individual long, narrow, adhesive bandages of the same size and rectangular shape arranged end to end and each including a piece 11 of adhesive plaster centrally carrying a gauze pad 12. One or more thin protective sheets (not shown) of crinoline or other suitable flexible material may overlie each gauze pad 12 and associated piece 11 of plaster. A thin flat continuous tube 13 of plain paper, glassine or other suitable material wraps the bandage units in line and forms with said units a continuous strip having similar thicker sections 14 spaced therealong at regular intervals where the gauze pads 12 are applied and similar thinner sections 15 located between the ends of the individual bandage units and resulting from the bare wrapping tube 13. This strip is adapted to be severed transversely at the thinner sections 15 midway between the ends of the individual bandage units. The ends of the cut wrapper beyond the bandage units may then be folded to complete the packaging of each bandage unit.

The continuous strip 10 is adapted to be fed by a feed device comprising a pair of opposed feed rolls 17 and 18 having feed gripping engagement with the strip therebetween, to advance it longitudinally towards some operating station, as for example, a cutting station. These rolls 17 and 18 are shown in superposed relationship and are mounted on respective shafts 20 and 21 supported on fixed centers in suitable bearings in the frame structure 22 of the machine. These shafts 20 and 21 may be driven in unison, as for example by means of intermeshing gears 23 and 24 on said shafts, respectively.

One of the rolls, as for example the lower roll 18, is of rigid construction, with its rim section supported in fixed concentric relationship with respect to its supporting shaft 21, and is shown specifically made of one piece of suitable metal such as steel. The roll 18 may be provided with a knurled periphery to increase its strip gripping characteristics.

The other upper roll 17 comprises a hub section 25 desirably of metal, such as steel, keyed or otherwise affixed to the shaft 20 and an outer rim section 26 also desirably of metal, such as steel, preferably faced with rubber, fabric or other material to enhance its frictional hold on the strip to be advanced, and radially spaced from the hub section 25 to permit limited radial movement of said rim section in the plane of the roll. The two roll sections 25 and 26 are resiliently connected or coupled together by resilient means varying in strength against radial deformation around the roll section 25. In the construction shown in Figs. 1–7, this resilient means takes the form of a series of elastic elements 27 and 28 arranged between the roll sections and around the hub section 25 and serving conjointly to urge yieldably the outer rim section 26 into centered position or into any predetermined radial position with respect to the axis of the shaft 20. The elastic elements 27 and 28 are constructed of varying strength, as will be more fully described, so that they yield with varying resistance to the advancing effort of the strip 10 according to the variations in the thickness of said strip.

The elastic elements 27 and 28 are desirably in the form of blocks of elastomeric material, such as rubber, and more specifically in the form of cylindrical rubber tubes arranged with their axes parallel to the shaft axis. The rubber tubes 27 and 28 are shown all of the same external and internal diameters and are set into correspondingly shaped pockets 30 and 31 located in the confronting peripheries of the roll sections 25 and 26. These pockets are arranged in pairs, with the pockets of each pair disposed in radial opposition. The rubber tubes 27 and 28 are firmly secured in these pockets 30 and 31 by any suitable means, as for example by cement, and key the two roll sections 25 and 26 for rotation in unison except for slight torsional displacement of the rim section 26. At the same time, these rubber tubes 27 and 28 yieldingly resist any eccentric or radial movement of the roll rim section 26 with relation to the hub section 25 and thus force this rim section against the strip 10 with yielding pressure.

For varying the resistance to the radial movement of the roll rim section 26 under the influence of strip feeding action, the rubber tubes 27 and 28 are of varying elastic strength. For that purpose, the rubber tubes 27 are made longer than the rubber tubes 28 and extend across the full width of the feed roll 17, while the shorter rolls 28 are centrally spaced between the opposite end faces of said feed roll.

The two groups of rubber tubes 27 and 28 are arranged according to the pattern of thin and thick sections regularly occurring in the strip 10. In the specific form of the invention shown, where the thick and thin strip sections 14 and 15 are substantially of equal length and are substantially of equal spacing, twelve rubber tubes, equally distanced circumferentially, are provided. These are arranged in alternate sets of three, each set comprising tubes of the same length, so that two diametrically opposite sets of long tubes 27 and two diametrically opposite sets of short tubes 28 in quadrant relationship are provided.

The rotative position of the roll 17 is set and predetermined to correspond with the linear position of the strip 10, so that the proper tubes 27 or 28 come into appropriate play to exert the desired pressure on said strip as the roll rotates. In the form of the invention shown, the length of the rim periphery of the roll 17 is twice that of an individual bandage unit of the strip. Moreover, the roll 17 is rotatively positioned in relation to the strip 10 to bring the axis A of symmetry of the two sets of longer rubber tubes 27 in coincidence with the common center line of the two rolls 17 and 18 when a thin section 15 of the strip is centrally located in the bite of the rolls, as shown in Fig. 1, and to bring the axis B of symmetry of the two sets of shorter rubber tubes 28 in coincidence with the common center line of the rolls when a thick section 14 of the strip is centrally located in the bite of the rolls, as shown in Fig. 3.

In the rotative position of the roll 17 shown in Fig. 1, the rim section 26 of the roll is deflected radially a minimum distance, but since the deflecting load is carried mostly by the longer stronger tubes 27, the force transmitted to the thin section 15 of the strip is nevertheless sufficient to feed it effectively.

In the rotative position of the roll 17 shown in Fig. 3, the shorter tubes 28 carry most of the load, the lower set of the tubes being mainly under compression and the upper set being mainly under tension. Under these conditions, the rim section 26 of the roll 17 is deflected radially a maximum distance determined by the thickness of the strip section 14 under feed pressure. The greater deformation of the shorter tubes 28, under the conditions shown in Fig. 3 in relation to the deformation of the longer tubes 27 under the conditions shown in Fig. 1, is compensated for by the weaker strength of the shorter tubes, so that the forces transmitted to the strip by the tubes 27 and 28 in both cases are substantially the same.

In the operation of the feed rolls 17 and 18, as the two rolls are rotated in unison in the direction of the arrows (Figs. 1 and 3), they feed the strip towards the right. As the roll 17 rotates from the position of minimum radial deflection of the rim section 26 of said roll shown in Fig. 1 to the position of maximum radial deflection shown in Fig. 3, the different sets of elastic tubes 27 and 28 come progressively into compressional or torsional play. While in the phase shown in Fig. 1, the main load is carried by the longer tubes 27 and in the phase shown in Fig. 3 the main load is carried by the shorter tubes 28, in the intermediate stages (where the thickness of the section of the strip under feed engagement with the rolls 17 and 18 may be somewhere inbetween that of the strip sections 14 and 15) the strip feeding load is shared mainly by both longer tubes 27 and shorter tubes 28. The resultant reaction of all the elastic tubes 27 and 28, however, remains substantially the same. The feeding pressure of the rolls 17 and 18 on the strip will, therefore, remain substantially constant throughout its length, irrespective of variations in the thickness of said strip.

In the specific form shown, the resistance of the individual rubber tubes 27 and 28 to elastic deformation has been varied by varying the length of these tubes. However, as far as certain aspects of the invention are concerned, the variation in the strength of the rubber tubes can be effected by changing their outside diameter, by changing their wall thickness or by changing their elastic characteristics.

Figure 10:
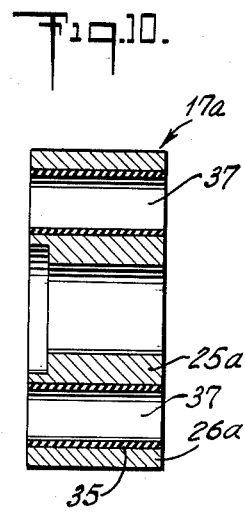
Fig. 10 is a section of the feed roll taken on lines 10—10 of Fig. 9.

Figs. 9 and 10 show a modified form of resiliently rimmed upper roll 17a comprising a hub section 25a, desirably of metal, such as steel, keyed or otherwise affixed to a shaft (not shown) and an outer rim section 26a also desirably of metal, such as steel, faced with rubber, fabric or other material in the form of a thin tire, to enhance its frictional hold on the strip to be advanced and radially spaced from the hub section 25a to permit limited radial movement of the rim section in the plane of the roll. The resilient means coupling the two roll sections 25a and 26a together comprises an annulus 35 of elastomeric material such as rubber, having its inner periphery attached to the outer periphery of the hub section 25a around the entire circumference desirably by vulcanization and having its outer periphery attached to the inner periphery of the rim section 26a around the entire circumference also desirably by vulcanization. This annulus 35 urges the rim section 26a into centered position with respect to the axis of the hub section 25a and is provided with holes 36 and 37 equally spaced circumferentially therearound. To cause the annulus 35 to yield with resistance varying according to the variations in the thickness of the advancing strip 10, the holes 36 are made smaller in diameter than the holes 37, and the holes are arranged according to the pattern of thin and thick sections occurring in the strip 10. For the specific type of strip 10 shown and described, the holes 36 and 37 are arranged in alternate sets of three, each set consisting of holes of the same diameter. Two diametrically opposite sets of holes 36 and two diametrically opposite sets of larger holes 37 are provided arranged in quadrant relation. The sections of the annulus 35 along the larger holes 37 are elastically weaker than the sections along the smaller holes 36. The rim section 26a will, therefore, yield more readily when the part of said rim section adjoining the region of the larger holes 37 comes into strip feeding nip position. The strip feeding pressure of the roll 17a will, therefore, remain substantially constant throughout the length of the strip, irrespective of variations in its thickness.

Figure 11:
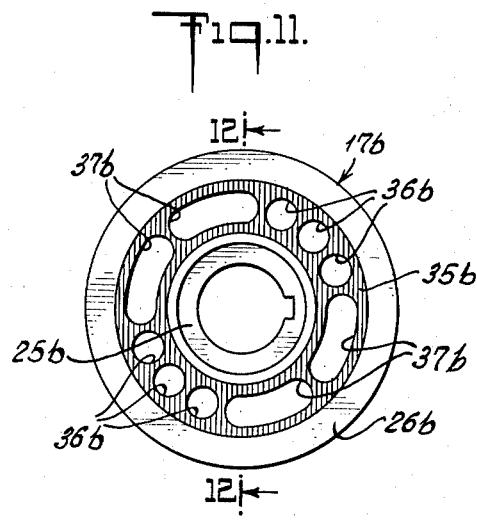
Fig. 11 is a face view of still another form of resiliently rimmed feed roll embodying the present invention.
Figure 12:
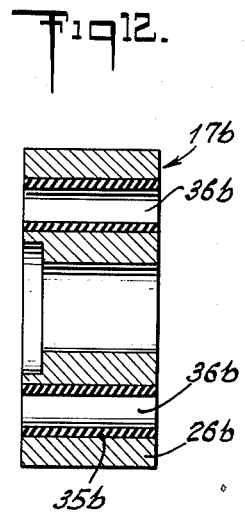
Fig. 12 is a section of the feed roll taken on lines 12—12 of Fig. 11.

Figs. 11 and 12 show still another form of resiliently rimmed upper roll 17b comprising a hub section 25b affixed to a shaft (not shown) and an outer rim section 26b faced with rubber, fabric or other frictional strip holding material and radially spaced from said hub section. These roll sections 25b and 26b are similar to the roll sections 25a and 26a in the construction of Figs. 9 and 10 and are coupled by resilient means comprising an annulus 35b of elastomeric material such as rubber, similar to the annulus 35 of Figs. 9 and 10 and similarly attached at its peripheries to the roll sections 25b and 26b. This annulus 35b, however, instead of being perforated with holes of different diameters as in the annulus 35, has round holes 36b of equal diameter equally spaced circumferentially. To cause the annulus 35b to yield with resistance varying according to the variations in the thickness of the advancing strip 10, the annulus 36b is cut away between holes to produce circumferentially elongated holes or slots 37b where less resistance to radial deformation is desired. The depth of cut-out between holes 36a is such as to produce the necessary variable resilient characteristics. The annulus 35b could be cut out between holes 36b as described after these holes have been formed to produce the elongated slots 37b or be pre-shaped or molded in the perforated form shown.

The round holes 36b and the slots 37b are arranged according to the pattern of thin and thick sections occurring in the strip 10 and for the specific type of strip 10 shown and described, the holes 36b and the slots 37b are arranged in alternate sets, each set of round holes 36b consisting of four holes and each set of slots 37b consisting of two slots, each resulting from cutting away the material between adjacent holes. The two sets of round holes 36b are arranged in diametrical opposition and the two sets of slots 37b are arranged in diametrical opposition and in quadrant relationship with respect to the sets of round holes 36b.

In the construction of Figs. 11 and 12 as shown, the sections of the annulus 35b along the slots 37b are resiliently weaker than the sections along the holes 36b. The rim section 26b will therefore yield more readily when strip feeding tractive pressure is applied to the part of said rim section adjoining the region of the slots 37b. The feeding pressure of the roll 17b will, therefore, remain substantially constant throughout the length of the strip, irrespective of variations in the thickness of said strip.

Instead of the forms shown in Figs. 9 to 12, with the solid rubber annulus perforated with openings equally spaced but varying in sizes, the openings may all be round and of the same diameter but the desired variation in resiliency may be obtained by varying the spacing between these openings.

In the form of the invention shown in Figs. 13, 14 and 15, the resiliently rimmed upper feed roll 17c comprises an inner or hub section 25c desirably of metal such as steel, keyed or otherwise affixed to a shaft (not shown) and an outer rim section 26c also desirably of metal, such as steel, faced with rubber, fabric or other suitable material to enhance its frictional hold on the strip to be advanced. The resilient means coupling the two feed roll sections 25c and 26c comprises a series (e. g. eight) of elastic elements 27c and 28c of elastomeric material, such as rubber, shaped in the form of solid rectangular blocks or strips radially set into pockets 30c and 31c located in the confronting peripheries of the roll sections 25c and 26c. These blocks 27c and 28c are arranged in alternate pairs with the blocks of like pairs disposed in radial opposition, thus being grouped according to the pattern of thin and thick sections regularly occurring in the strip to be fed. The blocks 27c and 28c are firmly secured in their pockets 30c and 31c by cement as shown or, if desired, by any other suitable means, as for example by vulcanization.

For varying the resistance to the radial movement of the feed roll rim section 26c under the influence of strip feeding action, the elastic blocks 27c are made longer than the elastic blocks 28c in directions parallel to the axis of the feed roll and extend across the full width of the feed roll 17c, while the shorter blocks 28c are centrally spaced between the opposite end faces of said feed roll.

Since the shorter blocks 28c are elastically weaker than the longer blocks 27c, the rim section 26c will yield more readily radially when a pair of blocks 28c is rotated in position to carry the load resulting from strip feeding pressure of the feed roll 17c. The resistance of the blocks 27c and 28c to deformation therefore, as the feed roll rotates in contact with the strip being fed, varies according to the thickness of the strip, with the result that the feeding pressure of the upper and lower feed rolls on the strip will remain substantially constant throughout its length. The same effect could be obtained by making the blocks 27c and 28c of the same length but of different degrees of hardness.

In a modified form of the invention shown in Figs. 16 and 17, the resiliently rimmed upper roll 17d comprises an inner or hub section 25d desirably of metal, such as steel, keyed or otherwise affixed to a shaft (not shown) and an outer rim section 26d also desirably of metal, such as steel, faced with rubber, fabric or other suitable material to enhance its frictional hold on the strip to be advanced. The resilient means coupling the two roll sections 25d and 26d together comprises a one-piece solid rubber core 35d of elastomeric material, such as rubber, embracing the hub section 25d. This rubber core 35d, having a rectangular cross-section in planes parallel to the axis of the roll 17d, extends from the hub section 25d to the rim section 26d in directions along which it is desired to offer greater resistance to the radial movement of the rim section and extends from the hub section short of the rim section in directions along which it is desired to offer less resistance to the radial movement of the rim section. To produce the desired variations in resistance to the radial movement of the rim section 26d in the feeding of the specific strip shown in Fig. 8, the elastic core 35d is in the form of a circular annulus, except for two diametrically opposite segmental cut-outs 40 imparting to said core the general shape of an oblong having straight parallel chordal sides 41 spaced from the rim section 26d and opposed circular shorter sides 42 quadrantly located with respect to said chordal sides and conformably engaging the inner periphery of the rim section. The parts 43 of the rim section 26d, subtended by the chordal sides 41, are substantially equal in length to the parts 44 of the rim section engaging the circular sides 42 of the elastic core 35d.

The elastic core 35d is fastened to the roll sections 25d and 26d by cement as shown, or by any other suitable means, as for example by vulcanization if desired, and its retention against axial displacement is assured by providing the ends of the hub section 25d and the ends of the rim section 26d with flanges 45 flanking said core.

In the operation of the feed roll 17d shown in Figs. 16 and 17, maximum resistance to radial movement of the rim section 26d is offered by the elastic core 35d, when a part 44 of said rim section in contact with the core is in pressure contact with the strip to be fed, and this resistance gradually increases until the center of this rim part reaches feeding contact with the strip in roll position shown in Fig. 16. At this stage, pressure is transmitted from the rim section 26d to the elastic core 35d centrally along its full diametrical length and resistance to its deformation is therefore at a maximum. Since the elastic core 35d has been cut away or is absent along the parts 43 of the rim section 26d, resistance to radial movement of said rim section is lower when said parts are in feeding contact with the strip and is lowest when the centers of these parts reach the strip being fed. The strip feeding pressure of the roll 17d will, therefore, remain substantially constant throughout the length of the strip in spite of the variations in its thickness.

Figs. 18 and 19 show still another modified form of feed roll 17e, in which the elastic core 35e coupling the inner or hub section 25e and the rim section 26e of the feed roll is in two pieces instead of one piece as in the construction of Figs. 16 and 17. In this modified construction, the elastic core 35e comprises two separate similar pieces 50 in the form of sectors of a circular annulus, secured to hub section 25e and to the rim section 26e, by cement as shown or by any other suitable means as for example by vulcanization, and extending in diametrical opposition about said hub section. Each of these sector pieces 50 has an angular dimension of about 90°, so that the parts of the rim section 26e in contact with the sector pieces 50 are substantially as long as the parts spaced from said sector pieces or out of contact therewith.

The operation of the feed roll 17e is substantially the same as that indicated for the feed roll 17d in the form shown in Figs. 16 and 17.

It should be noted that in all of the forms of the invention shown, the outer rim section of the upper feed roll is rigid except for a thin rubber or fabric tire or facing, and this rim section yields radially when in contact with the strip being fed. The outer rim section does not flatten out against the strip during feeding action but remains circular in contour during strip feeding action. By maintaining substantially line contact between the strip and the feed rolls, better tractive pressure control is possible.

What is claimed is:

1. In a strip feeding device, a feed roll rotatable about an axis and having a rim member encircling said axis, and a series of elastic elements of varying strength spaced around said axis and resiliently supporting said rim member for limited radial movement with respect to said axis.

2. In a device for feeding a continuous strip varying in thickness along its length in accordance with a regular predetermined repeat pattern, a feed roll rotatable about an axis and having a rim member encircling said axis, and a series of elastic elements of varying strength spaced around said axis and resiliently supporting said rim member for limited radial movement with respect to said axis, said elements being arranged and grouped in conformity with said pattern to transmit resultantly thereby feeding pressure of substantially constant value to the strip.

3. In a device for feeding a continuous strip having two sections of different thickness regularly spaced therealong in accordance with a predetermined repeat pattern, a feed roll comprising a hub member, a rim member encircling said hub member and radially spaced therefrom, the confronting peripheries of said members being provided with pockets arranged in pairs around the center of said hub member with the pockets of each pair disposed in radial opposition, and a series of elastic tubes between said members retained in said pockets with the axes of said tubes parallel to the axis of rotation of said rim member and resiliently supporting said rim member for limited radial movement with respect to said hub member, said elastic tubes varying in resiliency and being arranged in conformity with said pattern to transmit feeding pressure of substantially constant value to the strip.

4. In a device for feeding a flat continuous strip having two sections of different thickness alternately and repeatedly arranged therealong in accordance with a predetermined pattern, a feed roll comprising a hub member, a rim member encircling said hub member and radially spaced therefrom, and a series of elastic elements between said members coupling said members for rotation in unison and spaced around said hub member to support resiliently said rim member, said elastic elements being divided into two groups of different resiliency varying according to the thicknesses of the two strip sections and being arranged in sets, each set consisting of elastic elements of the same resiliency, the sets of different resiliency being alternately arranged around the hub member and being spaced in accordance with the spacing between successive strip sections of different thickness, to effect feeding of the strip with substantially uniform pressure.

5. In a device for feeding a flat continuous strip having two sections of different thickness alternately and repeatedly arranged therealong in accordance with a predetermined pattern, the feed roll comprising a hub member, a rim member encircling said hub member and radially spaced therefrom, and a series of elastic tubes between said members coupling said members for rotation in unison and spaced around said hub member with their axes parallel to the axis of said hub member to support resiliently said rim member, said tubes being divided into two groups of different resiliency varying according to the thicknesses of the two strip sections and being arranged in sets, each set consisting of tubes of the same resiliency, the sets of different resiliency being alternately arranged around the hub member and being spaced in accordance with the spacing between successive strip sections of different thickness, to effect feeding of the strip with substantially uniform pressure.

6. A feed roll according to claim 5 whose tubes in the two groups are of the same outer and inner diameters, but are of different lengths to vary their resiliency.

7. In a device for feeding a continuous strip having two sections of different thickness alternately and repeatedly arranged therealong in accordance with a predetermined pattern, a feed roll comprising a hub member, a rim member encircling said hub member and radially spaced therefrom, the confronting peripheries of said members being provided with pockets arranged in pairs around the center of said hub member with the pockets of each pair disposed in radial opposition, and a series of elastic tubes between said members retained in said pockets with the axes of said tubes parallel to the axis of rotation of said rim member and resiliently supporting said rim member for limited radial movement with respect to said hub member, said elastic tubes being divided into two groups of different resiliency varying according to the thicknesses of the two strip sections and being arranged into four sets, each set consisting of tubes of the same resiliency, said sets being arranged with two similar sets in diametrical opposition and with the two other similar sets also in diametrical opposition but angularly spaced from said first mentioned similar sets, in conformity with the spacing between successive strip sections, to effect feeding of the strip with substantially uniform pressure.

8. A feed roll according to claim 7 whose tubes in the two groups are of the same outer and inner diameters but are of different lengths to vary their resiliency.

9. In a strip feeding device, a feed roll rotatable about an axis and having a rim member adapted to encircle a shaft along said axis, and an annulus of resilient material adapted to encircle the shaft and attached to the rim member to support the rim member for limited radial movement with respect to the axis and defining around said axis zones of different strength and of such substantial circumferential lengths as to cause successive sections of the resilient material coming into successive strip feeding pressure influence of said rim member, as said feed roll rotates, to resist radial movement of said rim member in accordance with a well-defined pattern of variation.

10. In a strip feeding device, a feed roll rotatable about an axis and having a rim member encircling the axis and a single block of resilient material around the axis resiliently supporting the rim member for limited radial movement with respect to the axis and having a series of holes defining around said axis zones of different strength and of such substantial circumferential lengths as to cause successive sections of the resilient material coming into successive strip feeding pressure influence of said rim member, as said feed roll rotates, to resist radial movement of said rim member in accordance with a well-defined pattern of variation.

11. In a device for feeding a strip varying in thickness along its length in accordance with a predetermined pattern, a feed roll, an inner member of rigid material, an outer rim member of rigid material radially spaced from the inner member, and a resilient annulus coupling said members together and permitting limited radial movement of the rim member with respect to the inner member, said annulus having a series of holes of different sizes around the inner member varying the strength of said annulus around the inner member in conformity with said pattern to transmit feeding pressure of substantially constant value to the strip.

12. A feed roll according to claim 11, wherein the annulus is made of rubber and has its inner periphery vulcanized to the outer periphery of the inner member and its outer periphery vulcanized to the inner periphery of the rim member.

13. A feed roll according to claim 11, the holes in the annulus being spaced at substantially equal distances apart, and material missing between adjoining holes in certain regions of the annulus to weaken said regions.

14. In a strip feeding device, a feed roll rotatable about an axis and having a rim member encircling the axis, and a series of elastic elements in the form of solid blocks of varying elastic strength spaced around the axis and resiliently supporting the rim member for limited radial movement with respect to the axis.

15. In a strip feeding device, a feed roll rotatable about an axis and having a rim member encircling the axis, and a series of elastic elements in the form of solid blocks having the same cross-section in planes at right angles to the axis but varying in length in directions parallel to the axis, said elements being spaced around the axis and resiliently supporting the rim member for limited radial movement with respect to the axis.

16. In a strip feeding device, a feed roll comprising a hub member, a rim member encircling the hub member and radially spaced therefrom, the confronting peripheries of said members being provided with radial pockets arranged around the center of the hub member, and a series of radially extending elastic elements in the form of solid blocks having the same rectangular cross-section in planes at right angles to said axis but varying in length in directions parallel to said axis, said elements being retained in the pockets to support the rim member for limited radial movement with respect to the hub member.

17. In a device for feeding a flat continuous strip having two sections of different thickness alternately and repeatedly arranged therealong in accordance with a predetermined pattern, the feed roll comprising a hub member, a rim member encircling said hub member and radially spaced therefrom, and a series of solid elastic blocks between said members coupling said members for rotation in unison and spaced around the hub member to support resiliently the rim member, said blocks being in rectangular form and having the same cross-section in planes at right angle to the axis of the roll, said blocks being divided into groups of different lengths along the roll axis varying according to the thickness of the two strip sections, the blocks of the groups being alternately arranged around the hub member to effect feeding of the strip with substantially uniform pressure.

18. In a strip feed device, a feed roll rotatable about an axis and having a rim member encircling the axis and a core member of resilient material for yieldably supporting the rim member for radial movement with respect to said axis, said core member extending to the rim member along certain radial directions and receding from the rim member along other radial directions, whereby the elastic strength of the core member varies around said axis.

19. In a strip feed device, the feed roll as defined in claim 18, wherein the core member is in the form of a circular one-piece disc concentric with the rim member and having a segmental cut-out.

20. In a strip feed device, the feed roll as defined in claim 18, wherein the core member is in the form of a circular one-piece disc having a pair of diametrically opposite segmental cut-outs.

21. In a strip feed device, a feed roll having a hub member, a rim member encircling the hub member, and a core member of resilient material embracing the hub member and supporting the rim member yieldably for radial movement with respect to the hub member, the core member extending from the hub member to and into contact with certain sections of the rim member and having one or more cut-outs freeing other sections of the rim member from direct support from the core member.

22. In a strip feed device, the feed roll as defined in claim 21, wherein the core member is in the form of a circular one-piece annulus, except for two diametrically opposite segmental cut-outs.

23. In a feed strip device, a feed roll rotatable about an axis and having a single rigid rim member encircling the axis, and a core member of resilient material yieldably supporting the rim member for radial bodily movement with respect to said axis and comprising a plurality of separate solid sector shaped pieces extending to the rim member and circumferentially spaced to provide sections of the rim member between the core pieces free from direct support from the core pieces.

24. In a strip feed device, a feed roll having a hub member, a single rigid rim member encircling the hub member, and a pair of solid diametrically opposite sector shaped core pieces of resilient material secured to the hub member and the rim member and supporting the rim member yieldably for bodily radial movement with respect to the hub member.

25. In a device for feeding a strip varying in thickness along its length in accordance with a predetermined pattern, a feed roll rotatable about an axis and having a rigid rim member and a resilient mounting for the rim member, said resilient mounting varying in strength around the axis of the roll in accordance with said pattern so as to offer a variable resistance to radial movement of the rim member in accordance with the variations in thickness of the strip and thus causing the rim member to exert substantially uniform feed pressure on the strip.

26. In a strip feeding device, a feed roll rotatable about an axis and having a rim member encircling said axis, and elastic means around said axis resiliently supporting said rim member for limited radial movement with respect to said axis and defining around said axis zones of different strength and of such substantial circumferential lengths as to cause successive sections of the elastic means coming into successive strip feeding pressure influence of said rim member, as said feed roll rotates, to resist radial movement of said rim member in accordance with a well-defined pattern of variation.

27. In a device for feeding a strip varying in thickness along its length in accordance with a predetermined pattern, a feed roll rotatable about an axis and having a rim member encircling said axis, and elastic means around said axis resiliently supporting said rim member for limited radial movement with respect to said axis and varying in strength around said axis to define alternate weaker and stronger zones sufficient in circumferential extent to vary the resistance of the elastic means to the compressing action of the rim member under strip feeding pressure in conformity with said pattern as the feed roll rotates and to transmit thereby feeding pressure of substantially constant value to the strip.

28. In a device for feeding a strip varying in thickness along its length in accordance with a predetermined pattern, a feed roll having a hub member of rigid material, a rim member of rigid material radially spaced from the hub member, and resilient means coupling said members together and permitting limited radial movement of the rim member, said resilient means varying in strength around the hub member in conformity with said pattern and defining alternate weaker and stronger zones of substantial circumferential lengths sufficient to vary the resistance of said resilient means to radial movement of said rim member under the influence of strip feeding pressure as the feed roll rotates, and to transmit thereby feeding pressure of substantially constant value to the strip.

29. A feed roll according to claim 28, wherein the resilient means is of rubber vulcanized to the outer periphery of the inner member and to the inner periphery of the rim member.

30. In a device for feeding a flat continuous strip having two sections of different thickness and of substantial lengths alternately and repeatedly arranged therealong in accordance with a predetermined pattern, the feed roll comprising a hub member, a rim member encircling said hub member and radially spaced therefrom, and resilient means between said members coupling said members for rotation in unison, said resilient means varying in strength around the hub member and having regions alternately arranged with regions of weaker resiliency around the hub member to vary the resistance of said resilient means to radial movement of the rim member, said regions being spaced in accordance with the spacing between successive strip sections of different thickness, and being of such circumferential lengths as to correspond to the lengths of said strip sections and to effect thereby feeding of the strip with substantially uniform pressure.

31. In a strip feeding device, a feed roll rotatable about an axis and having a rim member encircling said axis, and a series of elastic tubes spaced around said axis with their axes parallel to said axis and resiliently supporting said rim member for limited radial movement with respect to said axis, said elastic tubes varying in resiliency to permit feeding of a strip of varying thickness with substantially uniform pressure.

32. In a strip feeding device, a feed roll rotatable about an axis and having a rim member encircling said axis, and a series of elastic tubes spaced around said axis with their axes parallel to said axis and resiliently supporting said rim member for limited radial movement with respect to said axis, said elastic tubes being of similar outer and inner diameter but varying in length to vary their resiliency and to permit thereby feeding of a strip of varying thickness with substantially uniform pressure.

33. A device for feeding a strip varying in thickness along its length in accordance with a predetermined pattern, comprising a pair of opposed feed rolls adapted to engage the strip therebetween with feed gripping engagement to advance the strip longitudinally and means for positively driving said feed rolls in unison at the same peripheral speed, one of said feed rolls comprising a hub member of rigid material, a rim member of rigid material radially spaced from the hub member, and resilient means coupling said members together and permitting limited radial movement of the rim member, said resilient means varying in strength around the hub member in conformity with said pattern, and defining alternate weaker and stronger zones of substantial circumferential lengths sufficient to vary the resistance of said resilient means to radial movement of said rim member under the influence of strip feeding pressure as the feed rolls rotate, and to transmit thereby feeding pressure of substantially constant value to the strip.

(References on following page)

References Cited in the file of this patent

UNITED STATES PATENTS

| Number | Name | Date |
|---|---|---|
| 437,208 | Kinney | Sept. 30, 1890 |
| 1,232,053 | Lawrence | July 3, 1917 |
| 1,436,793 | Clark | Nov. 28, 1922 |
| 2,026,115 | Anthony | Dec. 31, 1935 |
| 2,120,735 | Debrie | June 14, 1938 |
| 2,145,320 | Shaw | Jan. 3, 1939 |
| 2,263,893 | Schulmann | Nov. 25, 1941 |
| 2,276,494 | Kellogg | Mar. 17, 1942 |
| 2,374,194 | Grupe | Apr. 24, 1945 |
| 2,548,839 | Coombes | Apr. 10, 1951 |